(12) United States Patent
Yamamoto (10) Patent No.: US 11,884,107 B2
(45) Date of Patent: Jan. 30, 2024

(54) TIRE

(71) Applicant: SUMITOMO RUBBER INDUSTRIES, LTD., Hyogo (JP)

(72) Inventor: Tetsuya Yamamoto, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 171 days.

(21) Appl. No.: 17/398,251

(22) Filed: Aug. 10, 2021

(65) Prior Publication Data

US 2022/0063344 A1 Mar. 3, 2022

(30) Foreign Application Priority Data

Aug. 25, 2020 (JP) ................................. 2020-141912

(51) Int. Cl.
*B60C 11/12* (2006.01)
*B60C 11/03* (2006.01)
*B60C 11/13* (2006.01)

(52) U.S. Cl.
CPC ...... *B60C 11/0306* (2013.01); *B60C 11/0327* (2013.01); *B60C 11/1259* (2013.01);
(Continued)

(58) Field of Classification Search
CPC ............. B60C 11/1281; B60C 11/1236; B60C 11/04; B60C 11/0304; B60C 11/0309;
(Continued)

(56) References Cited

U.S. PATENT DOCUMENTS

| 2010/0186861 A1* | 7/2010 | Ishiguro | B60C 11/1369 |
| | | | 152/209.25 |
| 2014/0224394 A1* | 8/2014 | Ochi | B60C 11/1369 |
| | | | 152/209.18 |
| 2014/0290815 A1* | 10/2014 | Tomida | B60C 11/1236 |
| | | | 152/209.18 |
| 2015/0375571 A1* | 12/2015 | Koishikawa | B60C 5/00 |
| | | | 152/209.18 |

(Continued)

FOREIGN PATENT DOCUMENTS

| EP | 0469816 A2 * | 2/1992 | ............. B60C 11/11 |
| EP | 543661 A1 * | 5/1993 | ............. B60C 11/11 |

(Continued)

OTHER PUBLICATIONS

European Search Report received in EP Application No. EP 21 18 6541, dated Jan. 5, 2022.

*Primary Examiner* — Justin R Fischer
*Assistant Examiner* — Philip N Schwartz
(74) *Attorney, Agent, or Firm* — Greenblum & Bernstein, P.L.C.

(57) ABSTRACT

The tire includes a tread portion having circumferential grooves extending in a tire circumferential direction and land regions demarcated by the circumferential grooves. The circumferential grooves include a first circumferential groove and a second circumferential groove adjacent to the first circumferential groove and having a width larger than the first circumferential groove. The land regions include a first land region demarcated between the first circumferential groove and the second circumferential groove. The first land region has lateral grooves extending in a tire axial direction and lateral sipes extending in the tire axial direction and each having a width smaller than that of each of the lateral grooves. A total value of the widths of the lateral grooves and the lateral sipes connected to the second cir- (Continued)

cumferential grooves is smaller than a total value of the widths of the lateral grooves and the lateral sipes connected to the first circumferential grooves.

18 Claims, 3 Drawing Sheets

(52) U.S. Cl.
CPC ...... *B60C 11/1272* (2013.01); *B60C 11/1281* (2013.01); *B60C 11/1384* (2013.01); *B60C 11/1236* (2013.01); *B60C 2011/039* (2013.01); *B60C 2011/0353* (2013.01); *B60C 2011/0365* (2013.01); *B60C 2011/0369* (2013.01); *B60C 2011/133* (2013.01)

(58) Field of Classification Search
CPC ................. B60C 11/1204; B60C 11/12; B60C 11/0306; B60C 11/0327; B60C 11/1259; B60C 11/1384; B60C 2011/1286; B60C 2011/1277; B60C 2011/1227; B60C 2011/1209; B60C 2011/0353; B60C 2011/0365; B60C 2011/0369; B60C 2011/039; B60C 2011/133

See application file for complete search history.

(56) References Cited

U.S. PATENT DOCUMENTS

| | | | |
|---|---|---|---|
| 2016/0193886 A1* | 7/2016 | Iwasaki | B60C 11/0309 152/209.24 |
| 2018/0201071 A1 | 7/2018 | Mishima et al. | |
| 2018/0319219 A1* | 11/2018 | Oba | B60C 11/0306 |
| 2019/0160880 A1* | 5/2019 | Wakasugi | B60C 11/1204 |
| 2019/0308460 A1* | 10/2019 | Kawagoe | B60C 11/04 |
| 2019/0375242 A1* | 12/2019 | Miyazaki | B60C 11/1272 |

FOREIGN PATENT DOCUMENTS

| | | | |
|---|---|---|---|
| EP | 0729854 A2 * | 9/1996 | B60C 11/11 |
| EP | 3 398 793 | 11/2018 | |
| EP | 3 489 038 | 5/2019 | |
| EP | 3 552 845 | 10/2019 | |
| JP | 2018-114846 A | 7/2018 | |

* cited by examiner

TIRE

This application claims the benefit of foreign priority to Japanese Patent Applications No. JP2020-141912, filed Aug. 25, 2020, which is incorporated by reference in its entirety.

Technical Field

The present invention relates to a tire having a tread portion.

Background Art

Conventional tires are known to have a tread portion having a plurality of circumferential grooves extending in the tire circumferential direction and a plurality of land regions demarcated by the circumferential grooves. For example, the tire of Patent Document 1 below has proposed a tire that can be used in all weather conditions, so-called an all-season tire, in which middle land regions demarcated by center main grooves and shoulder main grooves extending in the tire circumferential direction have a plurality of middle lateral grooves and middle sipes.

PRIOR ART DOCUMENT

Patent Document

Patent Document 1

Japanese Unexamined Patent Application Publication No. 2018-114846

SUMMARY OF THE INVENTION

Problems to be Solved by the Invention

However, although the tire disclosed in the Patent Document 1 has improved drainage performance and snow discharging performance by increasing a ratio of the grooves to improve wet performance and on-snow performance, pattern noise caused by air column resonance sound in the grooves tends to be increased, therefore, there has been a demand for further improvements in noise performance.

The present invention was made in view of the above, and a primary object thereof is to provide a tire capable of achieving the wet performance, and both of the on-snow performance and the nose performance.

Means for Solving the Problems

The present invention is a tire including a tread portion, wherein the tread portion is provided with a plurality of circumferential grooves extending in a tire circumferential direction and a plurality of land regions demarcated by the circumferential grooves, the circumferential grooves include a first circumferential groove and a second circumferential groove adjacent to the first circumferential groove and having a width larger than a width of the first circumferential groove, the land regions include a first land region demarcated between the first circumferential groove and the second circumferential groove, the first land region is provided with a plurality of lateral grooves extending in a tire axial direction and a plurality of lateral sipes extending in the tire axial direction and each having a width smaller than a width of each of the lateral grooves, and a total value of the widths of the lateral grooves and the lateral sipes connected to the second circumferential grooves is smaller than a total value of the widths of the lateral grooves and the lateral sipes connected to the first circumferential grooves.

In the tire according to the present invention, it is preferred that the number of the lateral grooves and the lateral sipes connected to the second circumferential groove is equal to the number of the lateral grooves and the lateral sipes connected to the first circumferential groove.

In the tire according to the present invention, it is preferred that the lateral grooves include first lateral grooves extending from the first circumferential groove and terminating in the first land region, and second lateral grooves extending from the second circumferential groove and terminating in the first land region, and each of lengths in the tire axial direction of the first lateral grooves and the second lateral grooves is 20% or more and 35% or less of a width in the tire axial direction of the first land region.

In the tire according to the present invention, it is preferred that the lateral sipes include wide lateral sipes each having a width smaller than the width of each of the lateral grooves, and narrow lateral sipes each having a width smaller than the width of each of the wide lateral sipes, and the narrow lateral sipes include first narrow lateral sipes each connecting a respective one of the first lateral grooves and the second circumferential groove, and second narrow lateral sipes each connecting a respective one of the second lateral grooves and the first circumferential groove.

In the tire according to the present invention, it is preferred that the lateral sipes include wide lateral sipes each having a width smaller than the width of each of the lateral grooves, and narrow lateral sipes each having a width smaller than the width of each of the wide lateral sipes, and the wide lateral sipes extend from the first circumferential groove and terminate within the first land region.

In the tire according to the present invention, it is preferred that a length in the tire axial direction of each of the wide lateral sipes is 60% or more and 80% or less of a width in the tire axial direction of the first land region.

In the tire according to the present invention, it is preferred that the narrow lateral sipes include third narrow lateral sipes each connecting a respective one of the wide lateral sipes and the second circumferential groove.

In the tire according to the present invention, it is preferred that a depth of each of the wide lateral sipes is 60% or more and 80% or less of a depth of the first circumferential groove.

In the tire according to the present invention, it is preferred that the first land region is provided with cutout portions recessed in the tire axial direction from the first circumferential groove.

In the tire according to the present invention, it is preferred that the first circumferential groove is a shoulder circumferential groove arranged on an outer side in the tire axial direction, and the second circumferential groove is a crown circumferential groove arranged axially inside the shoulder circumferential groove.

Effects of the Invention

In the tire according to the present invention, the circumferential grooves include the first circumferential groove and the second circumferential groove adjacent to the first circumferential groove and having the width larger than the width of the first circumferential groove, the land regions include the first land region demarcated between the first circumferential groove and the second circumferential groove, and the first land region is provided with a plurality of the lateral grooves extending in the tire axial direction and a plurality of the lateral sipes extending in the tire axial direction and each having the width smaller than the width of each of the lateral grooves. The tire configured as such can improve the drainage performance, the snow discharging performance, and an edge effect by the lateral grooves and the lateral sipes, therefore, the wet performance and the on-snow performance can be improved.

In the tire according to the present invention, the total value of the widths of the lateral grooves and the lateral sipes connected to the second circumferential grooves is smaller than the total value of the widths of the lateral grooves and the lateral sipes connected to the first circumferential grooves. In the tire configured as such, since the total value of the widths of the lateral grooves and the lateral sipes connected to the second circumferential grooves having the larger width is smaller, the air column resonance sound is suppressed, therefore, the noise performance can be improved. Thereby, the tire according to the present invention can achieve both the wet performance and the on-snow performance in addition to the noise performance.

MODE FOR CARRYING OUT THE INVENTION

An embodiment of the present invention will now be described in conjunction with accompanying drawings.

Figure 1:
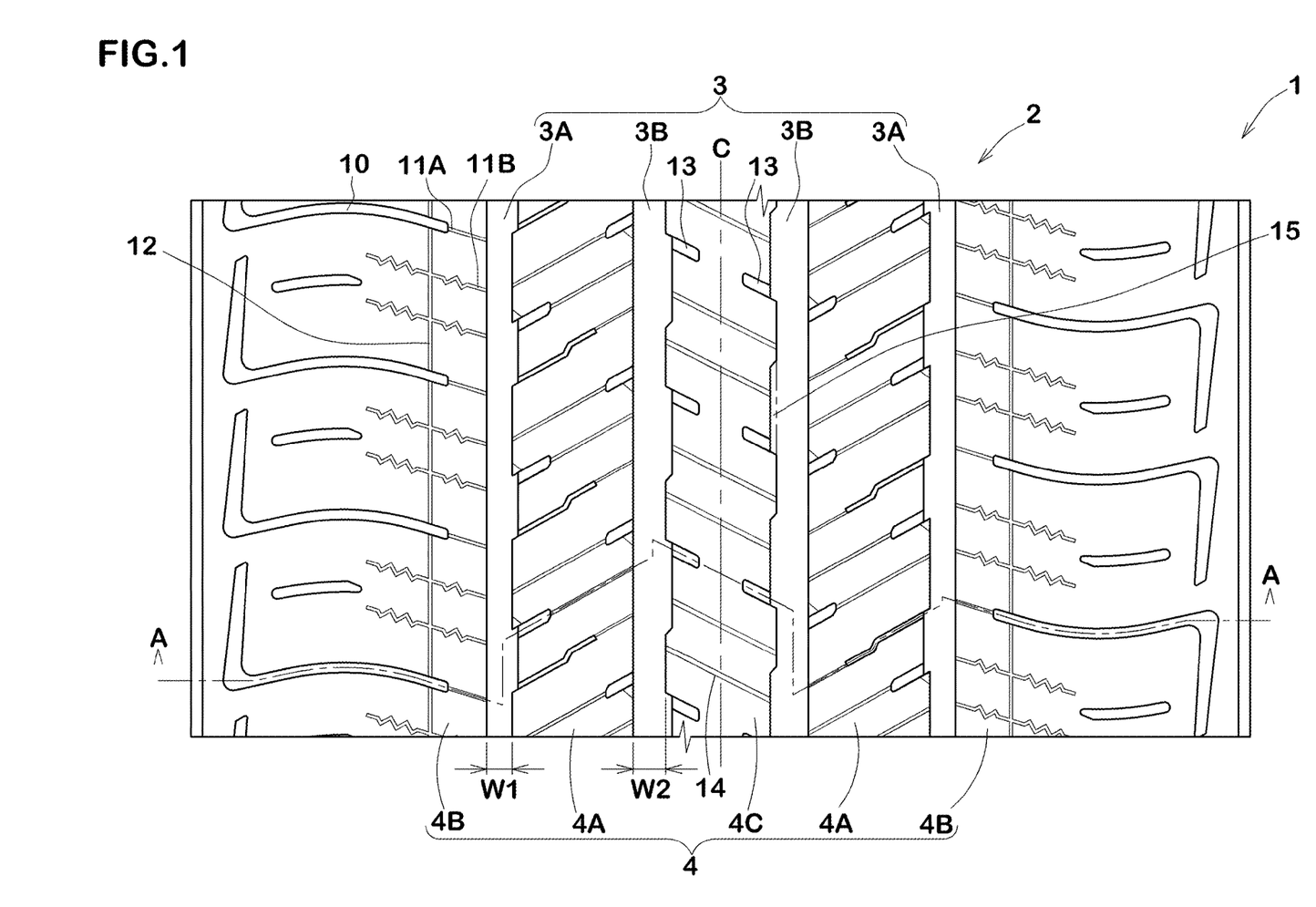
FIG. 1 a development view showing an embodiment of a tread portion of a tire according to the present invention.

FIG. 1 is a development view showing a tread portion 2 of a tire 1 according to the present embodiment. As shown in FIG. 1, the tire 1 of the present embodiment has the tread portion 2 that comes into contact with the ground while running.

The tire 1 is suitably used as a pneumatic tire for all-weather driving to be mounted on passenger cars and SUVs, for example. Here, the tire 1 for all-weather driving means the tire 1 for which steering stability on dry road surfaces (hereinafter referred to as "dry performance"), braking performance on wet road surfaces (hereinafter referred to as "wet performance"), and the steering stability on snowy road surfaces (hereinafter referred to as "on-snow performance") are required. The tire 1 is not limited to such an embodiment, but can be used for a variety of tires, such as pneumatic tires for heavy duty and non-pneumatic tires that are not filled with pressurized air inside, for example.

The tread portion 2 of the present embodiment is provided with a plurality of circumferential grooves 3 extending in a tire circumferential direction and a plurality of land regions 4 demarcated by the circumferential grooves 3. The circumferential grooves 3 include first circumferential grooves 3A and a second circumferential grooves 3B each adjacent to a respective one of the first circumferential grooves 3A and having a larger groove width than the first circumferential grooves 3A, for example. The land regions 4 of the present embodiment include first land regions 4A each demarcated between one of the first circumferential grooves 3A and a respectively adjacent one of the second circumferential grooves 3B.

Figure 2:
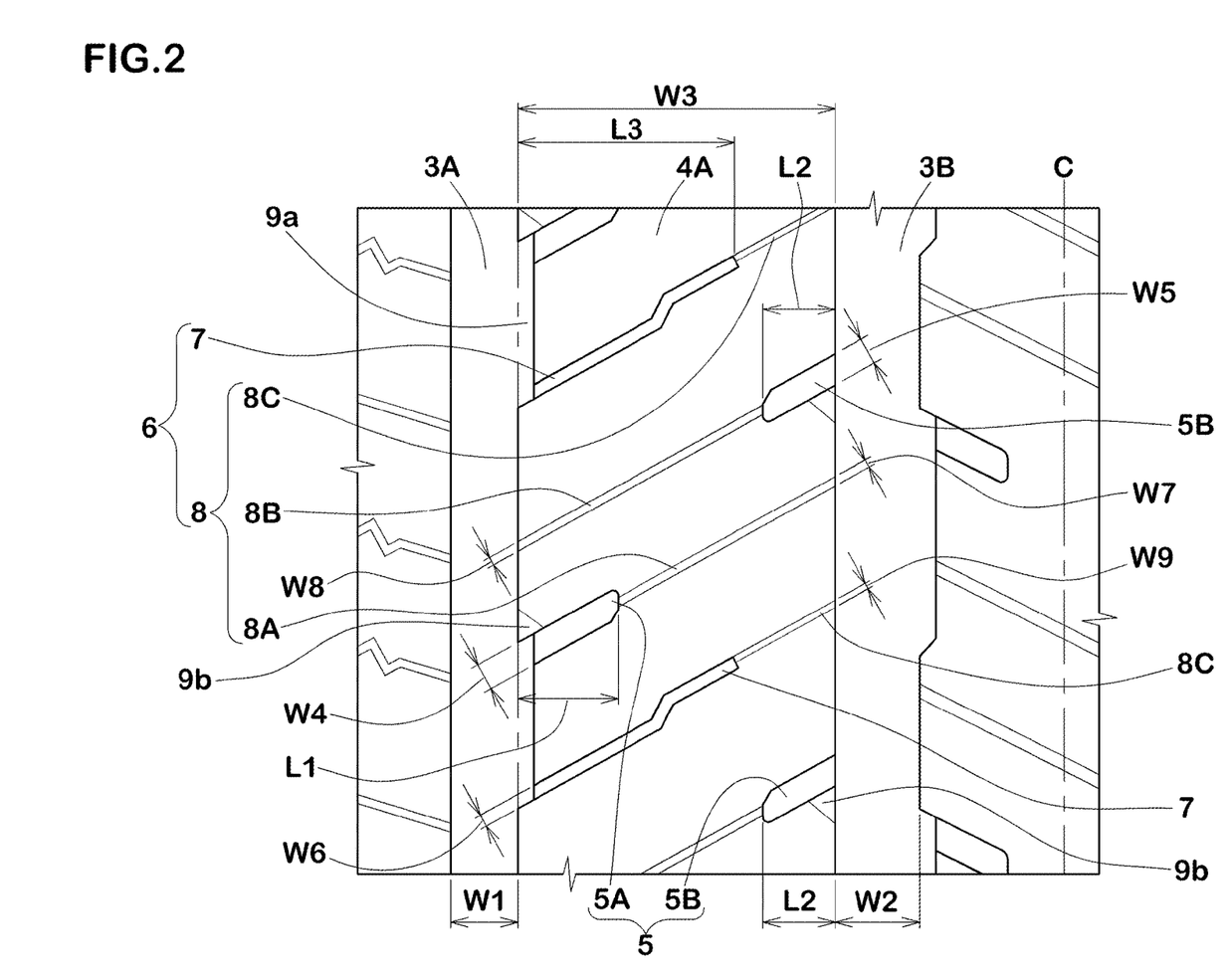
FIG. 2 an enlarged view showing a first land region.

FIG. 2 is an enlarged view of the first land regions 4A. As shown in FIG. 2, it is preferred that the first land regions 4A is provided with a plurality of lateral grooves 5 extending in a tire axial direction and a plurality of lateral sipes 6 extending in the tire axial direction and each having a width smaller than that of ach of the lateral grooves 5. The tire 1 configured as such can improve the drainage performance, the snow discharging performance, and edge effect by the lateral grooves 5 and the lateral sipes 6, therefore, the wet performance and the on-snow performance can be improved.

Here, in the present specification, the term sipe is defined as a narrow incision having a width of 2.0 mm or less. On the other hand, a groove is defined as a recess having a groove width greater than 2.0 mm. Further, the term width is defined as a width in a direction perpendicular to the longitudinal direction of the grooves and the sipes at an outer surface of the tire measured, and is the maximum value of the width excluding portions which locally vary in size such as later-described cutout portions (9a), chamfered portions (9b), and the like.

It should be noted that, in the present specification, dimensions and the like of various parts of the tire 1 are the values measured under the standard state unless otherwise noted. Here, in the case where the tire 1 is a pneumatic tire, the term "standard state" means a state in which the tire 1 is mounted on the standard rim, inflated to the standard inner pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO, if there is a standardization system that includes the standard on which the tire 1 is based. If there is no standardization system that includes the standard on which the tire 1 is based, the "standard rim" refers to a wheel rim specified for the concerned tire by the manufacturer and the like.

The "standard inner pressure" is an air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in IRA, and "INFLATION PRESSURE" in ETRTO, if there is a standardization system that includes the standard on which the tire 1 is based. If there is no standardization system that includes the standard on which the tire 1 is based, the "standard inner pressure" refers to an air pressure specified for the concerned tire by the manufacturer and the like.

In the present embodiment, the total value of the groove widths of the lateral grooves 5 and the lateral sipes 6 connected to the second circumferential grooves 3B is smaller than the total value of the groove widths of the lateral grooves 5 and the lateral sipes 6 connected to the first circumferential grooves 3A. In the tire 1 configured as such, since the total value of the groove widths of the lateral grooves 5 and the lateral sipes 6 connected to the second circumferential grooves 3B having a larger groove width is smaller, the air column resonance sound is suppressed, therefore, the noise performance can be improved. Thereby, the tire 1 of the present embodiment is able to achieve the wet performance and both the on-snow performance and the noise performance.

As a more preferred embodiment, a groove width W2 of each of the second circumferential grooves 3B is 105% or more and 120% or less of a groove width W1 of each of the first circumferential grooves 3A. Since the groove width W2 of each of the second circumferential grooves 3B is 105% or more of the groove width W1 of each of the first circumferential grooves 3A, the drainage performance of the second circumferential grooves 3B is improved, therefore, the wet performance of the tire 1 can be further improved. From such a point of view, the groove width W2 of each of the second circumferential grooves 3B is more preferably 108% or more, and even more preferably 110% or more, of the groove width W1 of each of the first circumferential grooves 3A.

Since the groove width W2 of each of the second circumferential grooves 3B is 120% or less of the groove width W1 of each of the first circumferential grooves 3A, rigidity decrease of the first land regions 4A is suppressed, therefore, the dry performance and anti-wear performance of the tire 1 can be improved. From such a point of view, the groove width W2 of each of the second circumferential grooves 3B is more preferably 117% or less and even more preferably 115% or less of the groove width W1 of each of the first circumferential grooves 3A.

In the present embodiment, the number of the lateral grooves 5 and the lateral sipes 6 connected to the second circumferential grooves 3B is equal to the number of the lateral grooves 5 and the lateral sipes 6 connected to the first circumferential grooves 3A. For this reason, in the present embodiment, the difference between the total value of the groove widths of the lateral grooves 5 and the lateral sipes 6 connected to the first circumferential grooves 3A and the total value of the groove widths of the lateral grooves 5 and the lateral sipes 6 connected to the second circumferential grooves 3B is based on the difference between the widths of the lateral grooves 5 and the lateral sipes 6 connected to the first circumferential grooves 3A and the widths of the lateral grooves 5 and the lateral sipes 6 connected to the second circumferential grooves 3B.

The lateral grooves 5 include first lateral grooves 5A each extending from one of the first circumferential grooves 3A and terminating in a respective one of the first land regions 4A, and second lateral grooves 5B each extending from one of the second circumferential grooves 3B and terminating in a respective one of the first land regions 4A, for example. The lateral grooves 5 configured as such can improve the wet performance and the on-snow performance of the tire 1 without decreasing the rigidity of first land regions 4A.

It is preferred that a length L1 in the tire axial direction of each of the first lateral grooves 5A is 20% or more and 35% or less of a width W3 in the tire axial direction of each of the first land regions 4A. Since the length L1 of each of the first lateral grooves 5A is 20% or more of the width W3 of each of the first land regions 4A, the drainage performance and snow shearing force are improved, therefore, the wet performance and the on-snow performance of the tire 1 can be improved. From such a point of view, the length L1 of each of the first lateral grooves 5A is more preferably 23% or more, and even more preferably 25% or more, of the width W3 of each of the first land regions 4A.

Since the length L1 of each of the first lateral grooves 5A is 35% or less of the width W3 of each of the first land regions 4A, the rigidity of the first land regions 4A is maintained, therefore, the dry performance and the anti-wear performance of the tire 1 can be improved. From such a point of view, the length L1 of each of the first lateral grooves 5A is more preferably 32% or less, and even more preferably 30% or less, of the width W3 of each of the first land regions 4A.

It is preferred that a length L2 in the tire axial direction of each of the second lateral grooves 5B is 20% or more and 35% or less of the width W3 in the tire axial direction of each of the first land regions 4A. Since the length L2 of each of the second lateral grooves 5B is 20% or more of the width W3 of each of the first land regions 4A, the drainage performance and the snow shearing force are improved, therefore, the wet performance and the on-snow performance of the tire 1 can be improved. From such a point of view, the length L2 of each of the second lateral grooves 5B is preferably 23% or more, and even more preferably 25% or more, of the width W3 of each of the first land regions 4A.

Since the length L2 of each of the second lateral grooves 5B is 35% or less of the width W3 of each of the first land regions 4A, the rigidity of the first land regions 4A is maintained, therefore, the dry performance and the anti-wear performance of the tire 1 can be improved. From such a point of view, the length L2 of the second lateral grooves 5B is preferably 32% or less, and even more preferably 30% or less, of the width W3 of each of the first land regions 4A.

The length L2 of each of the second lateral grooves 5B in the present embodiment is smaller than the length L1 of each of the first lateral grooves 5A. The second lateral grooves 5B configured as such suppress the decrease in the rigidity of each of the first land regions 4A on the side of the respective second circumferential groove 3B of which groove width W2 is large, therefore, the dry performance and the anti-wear performance of the tire 1 can be improved.

It is preferred that a groove width W4 of each of the first lateral grooves 5A is 30% or more and 40% or less of the groove width W1 of each of the first circumferential grooves 3A. It is preferred that a groove width W5 of each of the second lateral grooves 5B is 25% or more and 35% or less of the groove width W2 of each of the second circumferential grooves 3B. The groove width W5 of each of the second lateral grooves 5B of the present embodiment is equal to the groove width W4 of each of the first lateral grooves 5A. The lateral grooves 5 configured as such are suitable for achieving both the on-snow performance and the noise performance of the tire 1.

Figure 3:
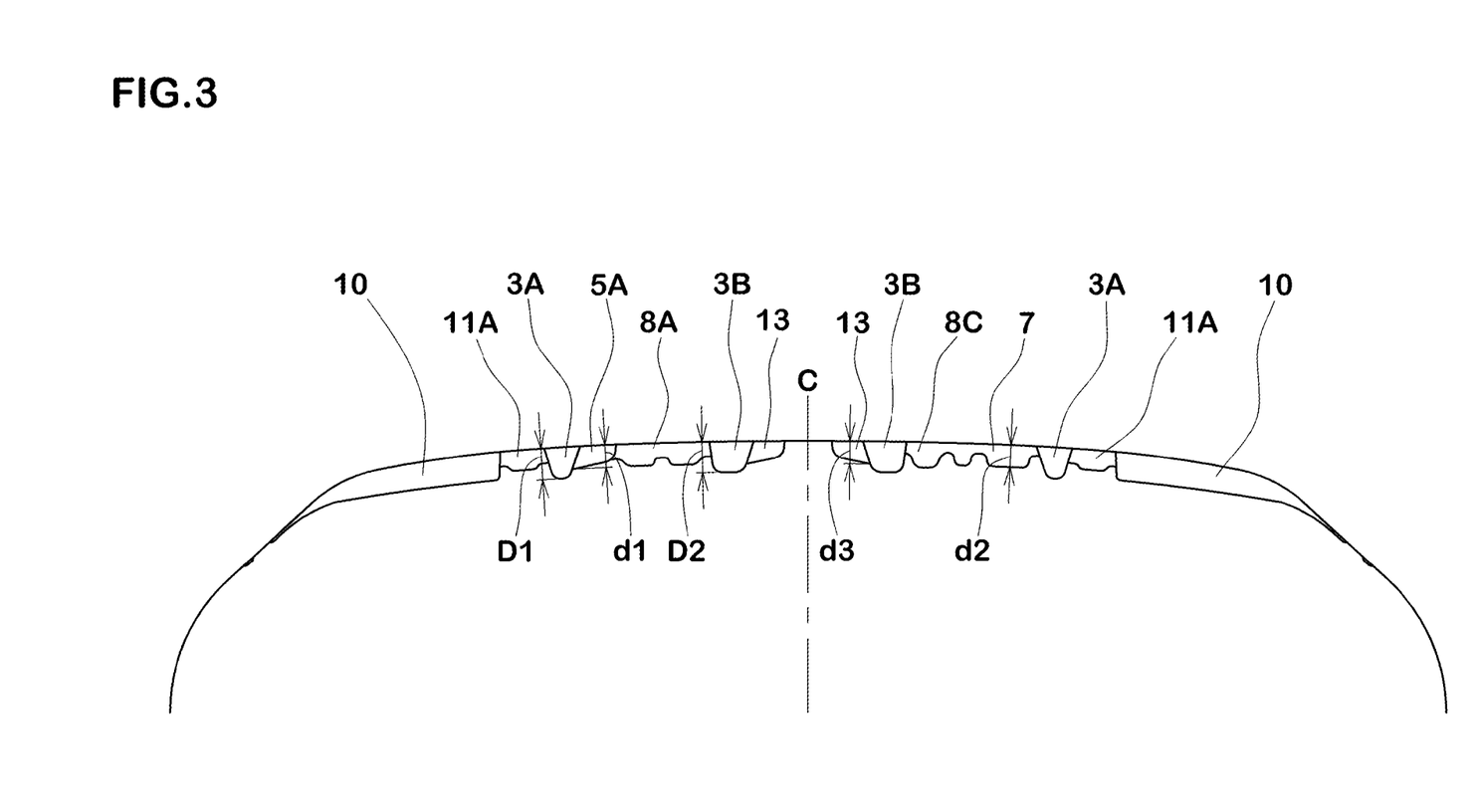
FIG. 3 a cross-sectional view taken along A-A line of FIG. 1.

FIG. 3 is a cross-sectional view taken along A-A line in FIG. 1. As shown in FIG. 3, it is preferred that a depth (d1) of each of the first lateral grooves 5A is 60% or more and 80% or less of a depth D1 of each of the first circumferential grooves 3A. The depth of each of the second lateral grooves 5B in the present embodiment is equal to the depth (d1) of each of the first lateral grooves 5A. The lateral grooves 5 configured as such are suitable for achieving both the on-snow performance and the noise performance.

As shown in FIG. 2, the lateral sipes 6 of the present embodiment include wide lateral sipes 7 each having a width smaller than that of each of the lateral grooves 5, and narrow lateral sipes 8 each having a width smaller than that of each of the wide lateral sipes 7. The lateral sipes 6 configured as such can improve both the on-snow performance by the edge effect and the noise performance by the small groove widths of the tire 1.

Each of the wide lateral sipes 7 of the present embodiment extends from one of the first circumferential grooves 3A and terminates in the respective first land region 4A. Each of the wide lateral sipes includes a plurality of, two in the present embodiment, bent portions. It is preferred that a width W6 of each of the wide lateral sipes 7 is 1.2 mm or more and 1.5 mm or less. The wide lateral sipes 7 configured as such can improve the wet performance and the on-snow performance of the tire 1.

It is preferred that a length L3 in the tire axial direction of each of the wide lateral sipes 7 is 60% or more and 80% or less of the width W3 in the tire axial direction of each of the first land regions 4A. Since the length L3 of each of the wide lateral sipes 7 is 60% or more of the width W3 of each of the first land regions 4A, good drainage performance and the edge effect are maintained, therefore, the wet performance and the on-snow performance of the tire 1 can be improved. From such a point of view, the length L3 of each of the wide lateral sipes 7 is more preferably 63% or more, and even more preferably 65% or more, of the width W3 of each of the first land regions 4A.

Since the length L3 of each of the wide lateral sipes 7 is 80% or less of the width W3 of each of the first land regions 4A, the rigidity of the first land regions 4A is maintained, therefore, the dry performance and the anti-wear performance of the tire 1 can be improved. From such a point of view, the length L3 of each of the wide lateral sipes 7 is more preferably 77% or less, and even more preferably 75% or less, of the width W3 of each of the first land regions 4A.

As shown in FIG. 3, it is preferred that a depth (d2) of each of the wide lateral sipes 7 is 60% or more and 80% or less of the depth D1 of each of the first circumferential grooves 3A. Since the depth (d2) of each of the wide lateral sipes 7 is 60% or more of the depth D1 of each of the first circumferential grooves 3A, the drainage performance can be improved, therefore, the wet performance of the tire 1 can be improved. From such a point of view, the depth (d2) of each of the wide lateral sipes 7 is more preferably 63% or more, and even more preferably 65% or more, of the depth D1 of each of the first circumferential grooves 3A.

Since the depth (d2) of each of the wide lateral sipes 7 is 80% or less of the depth D1 of each of the first circumferential grooves 3A, the rigidity of the first land regions 4A is maintained, therefore, the dry performance and the anti-wear performance of the tire 1 can be improved. From such a point of view, the depth (d2) of each of the wide lateral sipes 7 is preferably 77% or less, and even more preferably 75% or less, of the depth D1 of each of the first circumferential grooves 3A.

The narrow lateral sipes 8 include first narrow lateral sipes 8A each connecting a respective one of the first lateral grooves 5A and a respective one of the second circumferential grooves 3B, and second narrow lateral sipes 8B each connecting a respective one of the second lateral grooves 5B and a respective one of the first circumferential grooves 3A, for example. It is preferred that a width W8 of each of the second narrow lateral sipes 8B is equal to a width W7 of each of the first narrow lateral sipes 8A. It is preferred that the width W7 of each of the first narrow lateral sipes 8A and the width W8 of each of the second narrow lateral sipes 8B are each 1.0 mm or less.

It is preferred that the narrow lateral sipes 8 further include third narrow lateral sipes 8C each connecting a respective one of the wide lateral sipes 7 and a respective one of the second circumferential grooves 3B. Each of the third narrow lateral sipes 8C has a width W9 smaller than the width W7 of each of the first narrow lateral sipes 8A, for example.

The first land regions 4A of the present embodiment are provided with cutout portions (9a) recessed in the tire axial direction from a respective one of the first circumferential grooves 3A. Each of the cutout portions (9a) are provided between a respective one of the first lateral grooves 5A and its adjacent one of the wide lateral sipes 7, for example. The cutout portions (9a) configured as such increase the snow shearing force while supporting the drainage performance of the first circumferential grooves 3A, therefore, the wet performance and the on-snow performance of the tire 1 can be improved. In addition, since the cutout portions (9a) are partially provided along the longitudinal direction of the first circumferential grooves 3A, the impact on the noise performance of the tire 1 can be decreased.

The first land regions 4A of the present embodiment are provided with the chamfered portions (9b) at connection portions between the lateral grooves 5 and the circumferential grooves 3. The chamfered portions (9b) are provided at corner portions having acute angles between the Lateral grooves 5 and the circumferential grooves 3, for example. The chamfered portions (9b) configured as such suppress concentration of stress at the corner portions, therefore, partial chipping and uneven wear of the first land regions 4A can be suppressed.

As shown in FIG. 1, the land regions 4 include, for example, second land regions 4B each arranged on the opposite side of one of the first land regions 4A with a respective one of the first circumferential grooves 3A therebetween, and a third land region 4C arranged on the opposite sides of the first land regions 4A with the second circumferential grooves 3B therebetween. The third land region 4C of the present embodiment is demarcated between a pair of the second circumferential grooves 3B. It should ne noted that if there is one second circumferential grooves 3B, the third land region 4C is omitted.

The second land region 4B are provided with third lateral grooves 10, fourth narrow lateral sipes 11A, and fifth narrow lateral sipes 11B extending in the tire axial direction, for example. Each of the third lateral grooves 10 has at least an end portion on the first circumferential groove 3A side terminating in a respective one of the second land regions 4B. The third lateral grooves configured as such can improve the wet performance and the on-snow performance of the tire 1 without decreasing the rigidity of the second land regions 4B. Further, the third lateral grooves 10 are not connected to the first circumferential grooves 3A, therefore, the noise performance of the tire 1 can be improved.

It is preferred that each of the fourth narrow lateral sipes 11A connects a respective one of the third lateral grooves 10 and a respective one of the first circumferential grooves 3A. Each of the fifth narrow lateral sipes 11B extends at least partially in a zigzag manner from a respective one of the first circumferential grooves 3A, for example. The fourth narrow lateral sipes 11A and the fifth narrow lateral sipes 11B configured as such can improve both the on-snow performance of the tire 1 by the edge effect and the noise performance of the tire 1 by the small groove widths.

Each of the second land regions 4B of the present embodiment is provided with a longitudinal sipe 12 extending in the tire circumferential direction. The longitudinal sipe 12 extends so as to intersect the third lateral grooves 10 and the fifth narrow lateral sipes 11B, for example. The longitudinal sipes 12 configured as such can improve the on-snow performance of the tire 1 without decreasing the rigidity of the second land regions 4B.

The third land region 4C is provided with fourth lateral grooves 13 and second wide lateral sipes 14 extending in the tire axial direction, for example. It is preferred that each of the fourth lateral grooves 13 extends from one of the second circumferential grooves 3B and terminates in the third land region 4C. In the present embodiment, third land region 4C has the fourth lateral grooves 13 extending from both sides in the tire axial direction towards the inside of the third land region 4C. The fourth lateral grooves configured as such can improve the wet performance and the on-snow performance of the tire 1 without decreasing the rigidity of the third land region 4C.

As shown in FIG. 3, it is preferred that a depth (d3) of each of the fourth lateral grooves 13 is smaller than a depth D2 of each of the second circumferential grooves 3B. The fourth lateral grooves 13 configured as such are suitable for achieving both the on-snow performance and the noise performance.

As shown in FIG. 1, the second wide lateral sipes 14 cross the third land region 4C, for example. Each of the second wide lateral sipes 14 of the present embodiment is connected to both of a pair of the second circumferential grooves 3B. The second wide lateral sipes configured as such can improve the wet performance and the on-snow performance of the tire 1.

The third land region 4C of the present embodiment is provided with second cutout portions 15 each recessed in the tire axial direction from one of the second circumferential grooves 3B. The second cutout portions are arranged at positions each at least including one of the fourth lateral grooves. The second cutout portions 15 configured as such support the drainage performance of the second circumferential grooves 3B and increase the snow shearing force, therefore, the wet performance and the on-snow performance of the tire 1 can be improved. In addition, since the second cutout portions 15 are partially provided along the longitudinal direction of the second circumferential grooves 3B, the influence on the noise performance of tire 1 can be decreased.

In the present embodiment, the first circumferential grooves 3A are shoulder circumferential grooves arranged on both outer sides in the tire axial direction. Further, the second circumferential grooves 3B are crown circumferential grooves each arranged axially inside the respective shoulder circumferential groove. In the tire 1 configured as such, since the crown circumferential grooves arranged on axially inner sides have larger groove widths, the drainage performance can be improved, therefore, the wet performance can be improved. In addition, in the tire 1, since the shoulder circumferential grooves arranged on axially outer sides have smaller groove widths, the noise propagated to the outside can be reduced, therefore, the noise performance can be improved.

The first land regions 4A of the present embodiment are middle land regions. Further, the second land regions 4B of the present embodiment are shoulder land regions. In addition, the third land region 4C of the present embodiment are crown land regions. The tire 1 configured as such can achieve the wet performance and both the on-snow performance and the noise performance by the lateral grooves 5 and the lateral sipes 6 provided in the middle land regions.

While detailed description has been made of the tire according to an especially preferred embodiment of the present invention, the present invention can be embodied in various forms without being limited to the illustrated specific embodiment.

EXAMPLES

Tires having the tread pattern shown in FIG. 1 were made by way of test according to the specifications listed in Table 1. As a Reference, tires in which each of the lateral grooves crosses a respective one of the first land regions and the first land regions were not provided with the wide lateral sipes were made by way of test. By using these test tires, the dry performance, the wet performance, the on-snow performance, the noise performance, and the anti-wear performance were tested. Major common specifications and the test methods were as follows.

<Common Specifications>
Tire size: 255/50R20 105H
Rim size: 20×8.0 J
Tire inner pressure: 240 kPa
Test vehicle: mid-size 4WD-car
Tire mounting position: all wheels <Dry Performance>
While a test driver drove the test vehicle with the test tires mounted thereon on a dry paved road surface, the steering stability was evaluated by the test driver's feeling. The results are indicated by an index based on the Reference being 100, wherein the larger the numerical value, the better the evaluation is, which shows better dry performance.

<Wet Performance>
By using the test vehicle with the test tires mounted thereon, a braking distance was measured when the braking was performed at an initial speed of 100 km/h on a paved surface with a water film of 1 mm depth. The results are indicated by an index based on the Reference being 100, wherein the larger the numerical value, the smaller the braking distance is, which shows better wet performance.

<On-Snow Performance>
While the test driver drove the test vehicle with the test tires mounted thereon on a snowy road surface, the steering stability was evaluated by the test driver's feeling. The results are indicated by an index based on the Reference being 100, wherein the larger the numerical value, the better the evaluation is, which shows better on-snow performance.

<Noise Performance>
The test vehicle with the test tires mounted thereon was driven at a speed of 50 km/h on a noise-measuring road surface to measure pass-by noise level. The results are indicated by an index based on the Reference being 100, wherein the larger the numerical value, the smaller the pass-by noise level is, which shows better noise performance.

<Anti-Wear Performance>
A test vehicle with the test tires mounted thereon was driven on a dry paved road surface at an average speed of 80 km/h for 96 hours and then the remaining amount of the grooves was measured. The results are indicated by an index based on the Reference being 100, wherein the larger the numerical value, the larger the remaining amount of the grooves is, which shows better anti-wear performance.

The test results are shown in Table 1.

TABLE 1

|  | Reference | Example 1 | Example 2 | Example 3 | Example 4 | Example 5 |
|---|---|---|---|---|---|---|
| Width W3 of First land region [mm] | 28 | 28 | 30 | 30 | 30 | 30 |
| Ratio L1/W3 between Length L1 of First lateral groove and Width W3 of First land region [%] | 100 | 27 | 45 | 50 | 20 | 20 |
| Ratio L2/W3 between Length L2 of Second lateral groove and Width W3 of First land region [%] | 100 | 27 | 27 | 50 | 27 | 27 |
| Ratio L3/W3 between Length L3 of Wide lateral sipe and Width W3 of First land region [%] | — | 71 | 67 | 67 | 83 | 67 |

TABLE 1-continued

|  | Reference | Example 1 | Example 2 | Example 3 | Example 4 | Example 5 |
|---|---|---|---|---|---|---|
| Ratio d2/D1 between Depth d2 of Wide lateral sipe and Depth D1 of First circumferential groove [%] | — | 71 | 71 | 71 | 71 | 57 |
| Dry performance [index] | 100 | 102 | 105 | 102 | 103 | 104 |
| Wet performance [index] | 100 | 102 | 100 | 102 | 101 | 100 |
| On-snow performance [index] | 100 | 102 | 100 | 102 | 101 | 100 |
| Noise performance [index] | 100 | 102 | 105 | 103 | 103 | 104 |
| Anti-wear performance [index] | 100 | 102 | 105 | 102 | 103 | 104 |

From the test results, it was confirmed that the tires in the Examples, compared to those in the Reference, had good balance performance, which is evaluated as the sum of each performance and in particular, the wet performance and the on-snow performance were achieved together with the noise performance.

DESCRIPTION OF REFERENCE SIGNS 1 tire
2 tread portion
3 circumferential groove
3A first circumferential groove
3B second circumferential groove
4 land region
4A first land region
5 lateral groove
6 lateral sipe

The invention claimed is:

1. A tire, comprising:
a tread portion,
wherein the tread portion is provided with a plurality of circumferential grooves extending in a tire circumferential direction and a plurality of land regions demarcated by the circumferential grooves,
the circumferential grooves include a first circumferential groove and a second circumferential groove adjacent to the first circumferential groove and having a width larger than a width of the first circumferential groove,
the land regions include a first land region demarcated between the first circumferential groove and the second circumferential groove,
the first land region is provided with a plurality of lateral grooves extending in a tire axial direction and a plurality of lateral sipes extending in the tire axial direction and each having a width smaller than a width of each of the lateral grooves,
a total value of the widths of the lateral grooves and the lateral sipes connected to the second circumferential groove is smaller than a total value of the widths of the lateral grooves and the lateral sipes connected to the first circumferential groove,
the lateral sipes include wide lateral sipes each having a width smaller than the width of each of the lateral grooves, and narrow lateral sipes each having a width smaller than the width of each of the wide lateral sipes,
the wide lateral sipes extend from the first circumferential groove and terminate within the first land region, and
the narrow lateral sipes include third narrow lateral sipes each connecting a respective one of the wide lateral sipes and the second circumferential groove.

2. The tire according to claim 1, wherein the number of the lateral grooves and the lateral sipes connected to the second circumferential groove is equal to the number of the lateral grooves and the lateral sipes connected to the first circumferential groove.

3. The tire according to claim 1,
wherein the lateral grooves include first lateral grooves extending from the first circumferential groove and terminating in the first land region, and second lateral grooves extending from the second circumferential groove and terminating in the first land region, and
each of lengths in the tire axial direction of the first lateral grooves and the second lateral grooves is 20% or more and 35% or less of a width in the tire axial direction of the first land region.

4. The tire according to claim 3,
wherein the lateral sipes include wide lateral sipes each having a width smaller than the width of each of the lateral grooves, and narrow lateral sipes each having a width smaller than the width of each of the wide lateral sipes, and
the narrow lateral sipes include first narrow lateral sipes each connecting a respective one of the first lateral grooves and the second circumferential groove, and second narrow lateral sipes each connecting a respective one of the second lateral grooves and the first circumferential groove.

5. The tire according to claim 1,
wherein a length in the tire axial direction of each of the wide lateral sipes is 60% or more and 80% or less of a width in the tire axial direction of the first land region.

6. The tire according to claim 4,
wherein a depth of each of the wide lateral sipes is 60% or more and 80% or less of a depth of the first circumferential groove.

7. The tire according to claim 1,
wherein the first land region is provided with cutout portions recessed in the tire axial direction from the first circumferential groove.

8. The tire according to claim 1,
wherein the first circumferential groove is a shoulder circumferential groove arranged on an outer side in the tire axial direction, and
the second circumferential groove is a crown circumferential groove arranged axially inside the shoulder circumferential groove.

9. The tire according to claim 1, wherein a width of the second circumferential groove is 105% or more and 120% or less of a width of the first circumferential groove.

10. The tire according to claim 3, wherein the length in the tire axial direction of each of the second lateral grooves is smaller than the length in the tire axial direction of each of the first lateral grooves.

11. The tire according to claim 10, wherein a width of each of the first lateral grooves is 30% or more and 40% or less of the width of the first circumferential groove.

12. The tire according to claim 11, wherein a width of each of the second lateral grooves is equal to the width of each of the first lateral grooves.

13. The tire according to claim 3, wherein a depth of each of the first lateral grooves is 60% or more and 80% or less of a depth of the first circumferential groove.

14. The tire according to claim 4, wherein each of the wide lateral sipes has two bent portions so as to extend in a crank shape.

15. The tire according to claim 4, wherein a width of each of the wide lateral sipes is 1.2 mm or more and 1.5 mm or less.

16. The tire according to claim 15, wherein a width of each of the first narrow lateral sipes and a width of each of the second narrow lateral sipes are each 1.0 mm or less.

17. The tire according to claim 4,
wherein the narrow lateral sipes include third narrow lateral sipes each connecting a respective one of the wide lateral sipes and the second circumferential groove, and
each of the third narrow lateral sipes has a width smaller than a width of each of the first narrow lateral sipes.

18. The tire according to claim 7, wherein the first land region is provided with chamfered portions at connection portions between the lateral grooves and the circumferential grooves.

* * * * *